Feb. 18, 1930.　　　G. E. NERNEY　　　1,747,904
EYEGLASS CONSTRUCTION
Filed April 9, 1927
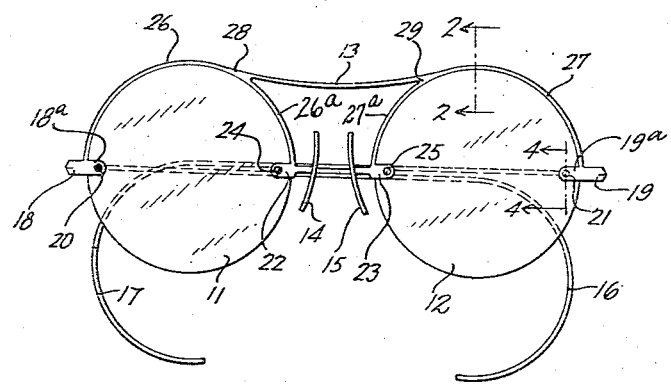
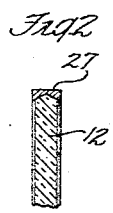
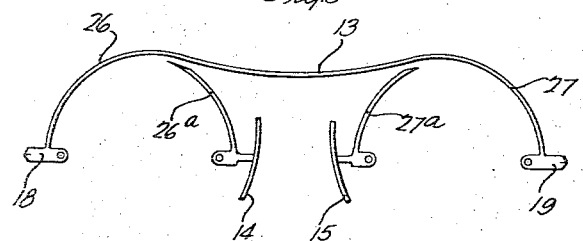
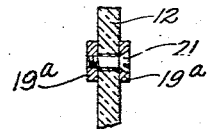
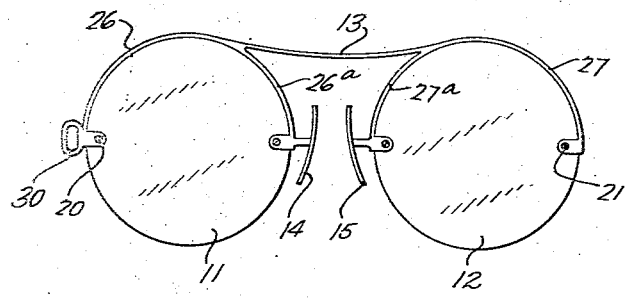
George E. Nerney INVENTOR
BY
Robert S. Blair ATTORNEY Patented Feb. 18, 1930

1,747,904

UNITED STATES PATENT OFFICE

GEORGE E. NERNEY, OF ATTLEBORO, MASSACHUSETTS

EYEGLASS CONSTRUCTION

Application filed April 9, 1927. Serial No. 182,196.

This invention relates to eyeglass construction and more particularly to lens mountings for eyeglasses.

One of the objects of the invention is to provide a construction of the above nature which is practical and efficient and capable of meeting the requirements of practical use in a highly satisfactory manner. Another object is to provide a construction of the above nature which embodies the advantageous features of a "rimless" mounting and is of far greater strength and durability. Another object is to provide a construction of the above nature which is neat and attractive in appearance. Another object is to provide a mounting of the above nature which is simple in construction and convenient to manufacture. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which are shown one or more of the various possible embodiments of this invention, Figure 1 is a front elevation of a mounting with which temple bars are used;

Figure 2 is a section taken along the line 2—2 of Figure 1, and showing the parts in larger detail;

Figure 3 shows the mounting of Figure 1 in the course of manufacture;

Figure 4 is a section taken along line 4—4 of Figure 1, and

Figure 5 shows a modified construction.

Similar reference characters refer to similar parts throughout the several views of the drawing.

Referring now to Figure 1 of the drawing more in detail, there are shown a pair of lenses 11 and 12 equipped with a mounting which includes a connecting bridge 13, nose pieces 14 and 15 and temple bars 16 and 17. The bridge member 13 shown herein is of the flat spring type and may tend to urge the lenses 11 and 12 toward each other and to hold the nose pieces 14 and 15 in against the sides of the nose. In this particular construction, it will be understood, the weight of the eyeglasses is carried upon the sides of the nose by the nose pieces 14 and 15, and the temple bars 16 and 17 engaging the backs of the ears or the sides of the head hold the eyeglasses against slipping forwardly. It is to be understood that the bridge 13 may take various forms and that the manner of supporting the eyeglasses upon the nose may be varied.

The temple bars 16 and 17 are pivoted respectively upon lugs or end members 18 and 19 which project outwardly from the outer edge portions of the respective lenses 11 and 12. For convenience and clarity it may be here noted that the edge portions of the lenses which are positioned adjacent the nose of the wearer will be termed the inner edge portions and the edge portions diametrically opposite the inner edge portions will be called the outer edge portions, while the top and bottom edges of the lenses will be called respectively the upper edge portions and the lower edge portions. The projecting lugs or end members 18 and 19 have portions 18$^a$ and 19$^a$ respectively which embrace the edge portions of the lenses and are secured thereto preferably by screws 20 and 21 passing through the glass as shown in Figure 4. The nose pieces 14 and 15 are mounted respectively upon lugs or end members 22 and 23 which have parts embracing inner edge portions of the lenses, and are secured thereto by screws 24 and 25 similar to the screws 20 and 21.

The member 18 and the member 22 are connected by a rim member 26 which extends upwardly from the two end members and about the upper edge portion of the lens. The two members 19 and 23 are connected by a similar rim member 27 extending about the upper edge portion of the lens 12. The bridge member 13 is connected at its respective ends to the two rim members 26 and 27. The term "rim member" or "rim portion" as employed herein, is to be interpreted broadly to comprehend any member or part extending about an edge portion of the lens in the approximate position which would be occupied by a part of an ordinary eyeglass rim.

This lens mounting is preferably constructed as is illustrated in Figure 3. The bridge portion 13, the rim portion 26 between the end of the bridge and the end member 18, and the rim portion 27 between the end of the bridge and the end member 19 comprise preferably one integral member shaped substantially as shown in Figure 3. The end members 18 and 19 may be and preferably are formed integrally with this member, or they may be secured to the ends thereof by soldering or welding or the like. The rim portion 26ª having at its end the part 23 is formed in a separate member and secured to the first member at the point 28 which forms the junction, in the completed structure, between the bridge member 13 and the rim member. The rim portion 27ª having the end member 23 thereon is similarly made in a separate piece and secured as by soldering or welding to the first member at the point 29. It will be seen that this method of construction is very simple and convenient to carry out and hence distinctly advantageous from a practical standpoint. Also, the resulting structure makes a very neat appearance.

The lens mounting above described achieves many important practical advantages. In the various well known types of "rimless" mountings or frames, the bridge, nose pieces, temple bar connecting members, or other parts, which are fastened to the lenses, continually become loose and are a source of constant trouble. If the connections are made tight so as to avoid loosening, the glass of the lenses is very apt to become strained and to break. Moreover, such rimless mountings as are generally in use afford no protection to the glass lenses. With the construction described herein sufficient play may be permitted the lenses to avoid the danger of straining and consequent breakage of the glass; the rim portions, connected at their two ends to the edge portions of the lenses prevent objectionable looseness and play and also absorb shocks and strains which would otherwise cause breakage of the lenses. The rim portions are preferably made flat, as shown in Figure 2, and may be highly polished so that they are quite unnoticeable. The wearer of this construction has the desired freedom from noticeable rims which are objectionable in coming into the line of vision below the eye but which are not so objectionable above the line of vision.

The construction shown in Figure 5 is similar to that shown in Figure 1 except that in the construction of Figure 5 the temple bars are not employed and the eyeglasses are held in place upon the wearer solely by the grip of the nose pieces 14 and 15. The rim members 26 and 27 are fastened at their ends to the edge portions of the lenses by screws 20 and 21 substantially as described in connection with Figure 1. To the end of one of the rim members, such as the rim member 26, is fastened or integrally formed a suitable projection 30 by means of which the eyeglasses may be handled or carried by a ribbon or chain if desired.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim as my invention:

1. In a lens mounting for eyeglasses, in combination with a pair of lenses, an integral metallic member comprising two rim portions and a connecting bridge portion, said rim portions extending respectively about the upper edges of the two lenses and terminating adjacent the outer edge portions of the lenses, a pair of rim portions connected to said first member adapted to extend from the ends of said bridge portion downwardly and terminate adjacent the inner edge portions of the lenses, and nose pieces mounted upon said last rim portions.

2. In a lens mounting for eyeglasses, in combination with a pair of lenses, an integral metallic member comprising two rim portions and a connecting bridge portion, said rim portions extending respectively about the upper edges of the two lenses and terminating adjacent the outer edge portions of the lenses, a pair of rim portions connected to said first member adapted to extend from the ends of said bridge portion downwardly and terminate adjacent the inner edge portions of the lenses, means upon said first rim portions for connecting temple bars thereto, and nose pieces mounted upon said last rim portions.

3. In a lens mounting for eyeglasses, in combination, a rim member adapted to arch over the upper edge portion of the lens, one end thereof being positioned adjacent the inner edge portion of the lens and the other end thereof being positioned adjacent the outer edge portion of the lens, means at each end of said rim member for making connection with an edge portion of the lens, and a bridge member connected to said rim member at a point above the inner end thereof and forming an acute angle with the portion of said rim member disposed beneath said point of connection.

4. In a lens mounting for eyeglasses, in combination, a rim member adapted to arch over the upper edge portion of the lens, one end thereof being positioned adjacent the inner edge portion of the lens and the other end thereof being positioned adjacent the outer edge portion of the lens, means at each end of said rim member for making connection with an edge portion of the lens, a bridge member connected to said rim member at a point above the inner end thereof and forming an acute angle with the portion of said rim member disposed beneath said point of connection, and a nose piece connected to said rim member adjacent to said inner end.

5. In a lens mounting for eyeglasses, in combination, a rim member adapted to arch over the upper edge portion of the lens, one end thereof being positioned adjacent the inner edge portion of the lens and the other end thereof being positioned adjacent the outer edge portion of the lens, means at each end of said rim member for making connection with an edge portion of the lens, a bridge member connected to said rim member at a point above the inner end thereof and forming an acute angle with the portion of said rim member disposed beneath said point of connection, a nose piece connected to said rim member adjacent to said inner end, and means adjacent the outer end of said rim member for connecting a temple bar.

6. In a lens mounting for eyeglasses, in combination with a pair of lenses, an integral metallic member comprising two rim portions and a connecting bridge portion, said rim portions extending respectively about the upper edges of the two lenses and terminating adjacent the outer edge portions of the lenses, and a pair of rim portions connected to said first member at an acute angle respectively with the ends of said bridge portion and adapted to extend from the said ends downwardly and terminate adjacent the inner edge portions of the lenses.

In testimony whereof, I have signed my name to this specification this 2nd day of April, 1927.

GEORGE E. NERNEY.